United States Patent
Venkateswaran et al.

(10) Patent No.: US 10,990,814 B2
(45) Date of Patent: Apr. 27, 2021

(54) CONVERTING AN IMAGE INTO A STRUCTURED TABLE

(71) Applicant: Microsoft Technology Licensing, LLC, Redmond, WA (US)

(72) Inventors: Gopalakrishnan Venkateswaran, Hyderabad (IN); Tumu Sree Bharath, Hyderabad (IN); Jeet Mukeshkumar Patel, Ahmedabad (IN); Ajit Kumar Singh, Hyderabad (IN); Milos Lazarevic, Nis (RS); Dhiresh Kumar Nagwani, Hyderabad (IN); Abhas Sinha, Hyderabad (IN); Ivan Vujic, Belgrade (RS); Naresh Jain, Hyderabad (IN); Sanjay Krupakar Bhat, Hyderabad (IN); Aleksandar Sretenovic, Belgrade (RS); Tamara Paunovic, Belgrade (RS); Aljosa Obuljen, Belgrade (RS); Sasa Vuckovic, Belgrade (RS); Dusan Lukic, Belgrade (RS); Catherine William Neylan, Seattle, WA (US); Marko Rakita, Novi Sad (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 113 days.

(21) Appl. No.: 16/234,183

(22) Filed: Dec. 27, 2018

(65) Prior Publication Data
US 2020/0097711 A1    Mar. 26, 2020

(30) Foreign Application Priority Data
Sep. 21, 2018 (IN) .............................. 201841035633

(51) Int. Cl.
*G06K 9/00* (2006.01)

(52) U.S. Cl.
CPC ..... *G06K 9/00449* (2013.01); *G06K 9/00456* (2013.01)

(58) Field of Classification Search
CPC .......... G06K 9/00449; G06K 9/00456; G06K 9/4604; G06K 2009/363; G06K 9/344;
(Continued)

(56) References Cited

U.S. PATENT DOCUMENTS

| | | | | |
|---|---|---|---|---|
| 6,028,970 | A | * | 2/2000 | DiPiazza .................. G06K 9/03 382/229 |
| 9,355,313 | B2 | * | 5/2016 | Sesum ............... G06K 9/00463 |

(Continued)

FOREIGN PATENT DOCUMENTS

JP      2010102709 A      5/2010

OTHER PUBLICATIONS

Jain, et al., "Document Representation and Its Application to Page Decomposition", In Proceedings of IEEE Transactions on Pattern Analysis and Machine Intelligence, vol. 20, Issue 3, Mar. 1, 1998, pp. 294-308.

(Continued)

*Primary Examiner* — Sheela C Chawan
(74) *Attorney, Agent, or Firm* — Mannava & Kang, P.C.

(57) ABSTRACT

A system for converting an image of an unstructured table into a structured table is provided. The system may comprise a memory storing machine readable instructions. The system may include a processor to receive an image of a unstructured table and convert the image of the unstructured table into a structured table. Converting the image of the unstructured table into the structured table may include providing cell mapping and low confidence determination to highlight potentially misconverted content. The low confidence deter- (Continued)

mination may be based on a first input and a second input. The processor may export the structured table, upon validation, to an application that supports structured tables.

20 Claims, 10 Drawing Sheets

(58) Field of Classification Search
CPC ......... G06K 9/3275; G06K 2009/3225; G06K 2209/01
USPC ....... 382/100, 112, 113, 133, 137, 143, 151, 382/152, 155, 156, 157, 158, 160, 168, 382/170, 173, 176, 181, 190, 189, 199, 382/200, 201, 216, 224, 225, 228, 232, 382/254, 266, 276, 289, 292, 296, 300, 382/305, 310, 312, 317, 321
See application file for complete search history.

(56) References Cited

U.S. PATENT DOCUMENTS

| | | | |
|---|---|---|---|
| 9,501,853 B2 | 11/2016 | Khan et al. | |
| 10,572,725 B1* | 2/2020 | Becker | G06K 9/3258 |
| 2006/0012568 A1 | 1/2006 | Halcrow et al. | |
| 2007/0177183 A1 | 8/2007 | Robinson et al. | |
| 2011/0249905 A1* | 10/2011 | Singh | G06K 9/00449 |
| | | | 382/225 |
| 2012/0189203 A1 | 7/2012 | Lin et al. | |
| 2014/0067631 A1* | 3/2014 | Dhuse | G06Q 40/12 |
| | | | 705/30 |
| 2015/0262007 A1 | 9/2015 | Sesum et al. | |
| 2017/0193292 A1 | 7/2017 | Bellert | |
| 2017/0220858 A1 | 8/2017 | Stitz et al. | |
| 2018/0285321 A1 | 10/2018 | Antony et al. | |

OTHER PUBLICATIONS

"International Search Report and Written Opinion Issued in PCT Application No. PCT/US2019/039109", dated Sep. 30, 2019, 13 Pages.
Wei, et al., "Improved Optical Character Recognition with Deep Neural Network", In Proceedings of IEEE 14th International Colloquium on Signal Processing & Its Applications (CSPA), Mar. 9, 2018, pp. 245-249.
"ABBYY FineReader 14 for Windows", Retrieved from: https://www.abbyy.com/en-us/finereader/compare-documents/#Detect-TextDifferences, Retrieved Date: Jul. 17, 2018, 9 Pages.
"ABBYY FineReader 14 OCR Editor", Retrieved from: https://www.abbyy.com/media/13208/4-convenient-verification-tool.png, Retrieved Date: Jul. 17, 2018, 2 Pages.
"How to Extract Tables from PDF", Retrieved from: https://www.youtube.com/watch?time_continue=28&v=Fc4prv1Mu34, Jan. 26, 2017, 4 Pages.
"SmartSoft Invoices", Retrieved from: https://www.smart-soft.net/products/invoice-ocr/smartsoft-invoices.htm, Retrieved Date: Jul. 17, 2018, 3 Pages.
Guo, et al., "On Calibration of Modern Neural Networks", In Proceedings of the 34 th International Conference on Machine Learning, Aug. 6, 2017, 14 Pages.
Jahan, et al., "Locating Tables in Scanned Documents for Reconstructing and Republishing", In Journal of Computing Research Repository, Dec. 2014, 6 Pages.
Sacheti, et al., "Object Detection from Image Content" Application as filed in U.S. Appl. No. 15/900,606, filed Feb. 20, 2018, 43 Pages.

* cited by examiner

|       | A     | B    | C     | D     |
|-------|-------|------|-------|-------|
| Price | 12.25 | 6.50 | 30.00 | 18.35 |
| Qty   | 200   | 150  | 1000  | 750   |
| Date  | Sep 10| Sep 10| Jan 1 | Mar 15|
| Profit| 20.0% | 5.0% | 15.0% | 35.5% |

In the broadest sense, economic development might be viewed as "any growth in real income per capita from whatever source." The substantial consumption of economic goods is possible only when there is substantial production of economic goods, and substantial production these days depends upon greater use of technologies.

Economics is the scientific study of the ownership, use, and exchange of scarce resources - often shortened to the science of scarcity.

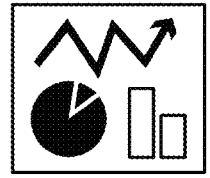

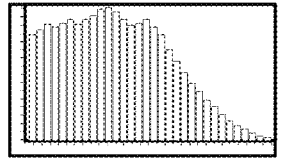

Economists describe changes in economic variables, and measure these changes over time.

FIG. 4C

CONVERTING AN IMAGE INTO A STRUCTURED TABLE

PRIORITY

The present application claims priority under 35 U.S.C. 119(a)-(d) to Indian patent application number 201841035633, having a filing date of Sep. 21, 2018, the disclosure of which is hereby incorporated by reference in its entirety.

TECHNICAL FIELD

This patent application relates generally to digital image processing, and more specifically, to systems and methods for converting an image into a structured table by identifying visible and invisible borders and using perspective correction, assisted previews, and cell mapping for detecting low confidence cells.

BACKGROUND

Converting a table into an electronic format, such as a spreadsheet, is a difficult and tedious task. Often times, such conversion requires manual recreation of the table, which is time-consuming and can be replete with human error and inaccuracies. Many institutions use some form of optical character recognition (OCR) technology to help digitize and convert information into electronic format. However, conventional OCR or other image processing techniques lack precision and consistency, resulting in mistakes and incorrect conversions when reproducing text and structure from an image. These may include poorly recognized digits, missing or incorrect punctuations, misidentified characters, strange rearrangement or misplaced cells of a table. Furthermore, because of these limitations, it is not unusual for conventional techniques to require additional manual verification of converted electronic documents, which in turn increases document conversion times and opens the door for additional human error. Despite recent OCR and image processing advances, these and other technical problems still persist.

As a result, a technique that converts an image into a structured table by identifying visible and invisible borders and using perspective correction, assisted previews, and cell mapping for detecting low confidence cells may be helpful to increase efficiencies and overcome shortcomings of conventional technologies.

BRIEF DESCRIPTION OF DRAWINGS

Features of the present disclosure are illustrated by way of example and not limited in the following Figure(s), in which like numerals indicate like elements, in which:

FIG. 4A-4C illustrate a screens of a conversion of an image having text and a table into a structured table by identifying visible and invisible borders and using perspective correction, according to an example;

DETAILED DESCRIPTION

Figure 1:
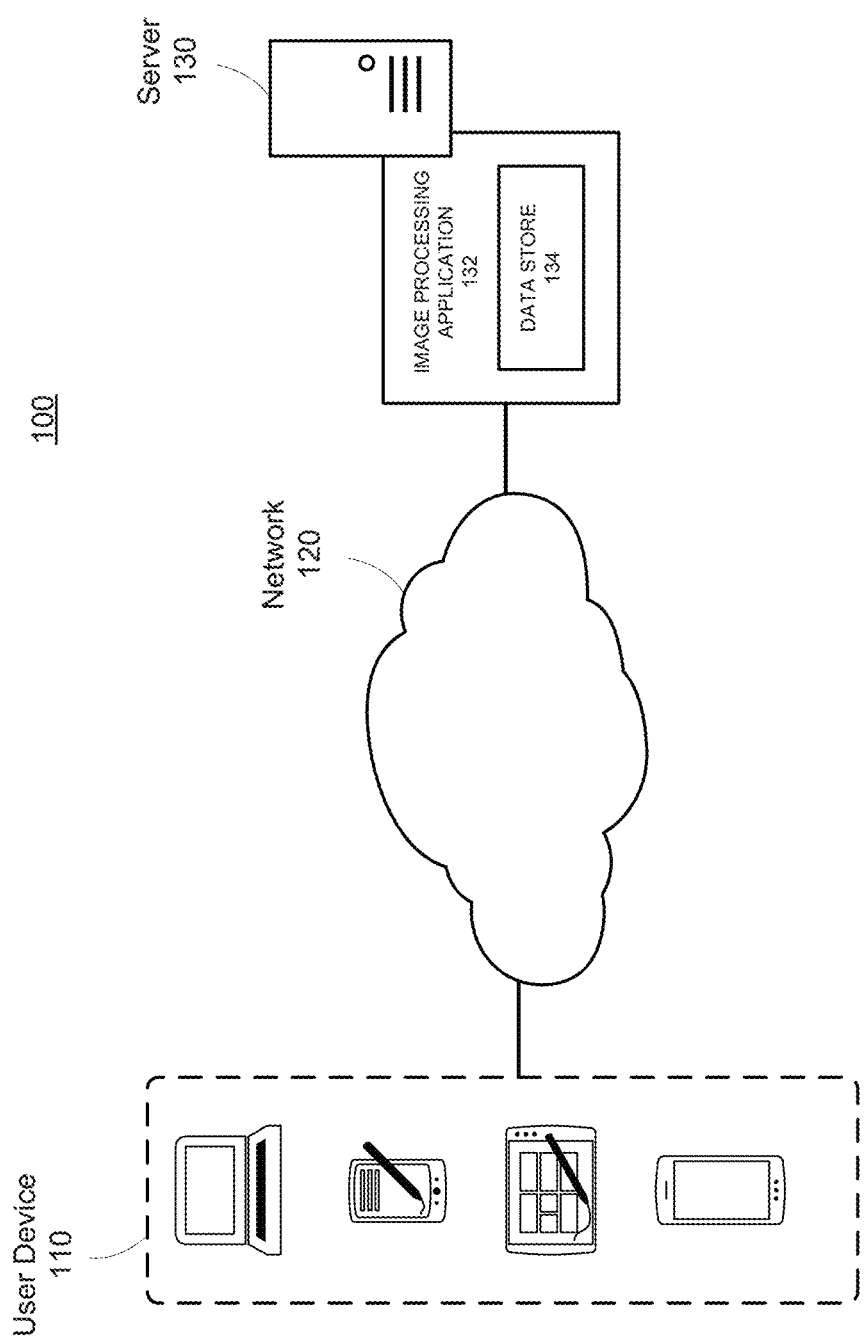
FIG. 1 illustrates a conceptual diagram of a system for converting an image into a structured table, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, converting a table into an electronic format, such as a spreadsheet, is rather a difficult and tedious task. Often times, such conversion requires manual recreation of that table, which is time-consuming and replete with human error and inaccuracies. While optical character recognition (OCR) technology has advanced in recent years to help digitize and convert information into electronic format, these or other conventional image processing techniques remain imprecise and inconsistent. For instance, poorly recognized digits, missing punctuations, misidentified characters, misplaced or rearranged cells of a table, lack of cross-checking features, and other technical problems continue to persist.

Accordingly, techniques for converting an image into a structured table are disclosed herein. In addition, techniques for perspective correction for misaligned source images may be provided. For example, an image of an unstructured table may be taken at an angle or with some perspectival inaccuracy. Therefore, providing a perspective correction may be important before proceeding to convert the unstructured image to a structured table. Using various alignment and mathematical calculations, the image may be realigned to correct any perspectival irregularities. As used herein, a structured table may be a collection of data held in a structured format in a database, the structured table having organized data that specifies columns and rows and can be readily used in various applications because of such organization. An unstructured table, on the other hand, may be a collection of data held in an unstructured format (not in a pre-defined manner) and therefore may not be as readily used. An image of a table may be unstructured because it largely contains binary large objects that are relatively unmanaged documents and/or unstructured files.

Once these perspectival corrections are made, detection of table borders (both visible and invisible) may be provided. Perspective correction may provide a preprocessing step for achieving high accuracy, but identifying horizontal and vertical border from the image and/or associated tables in the image may form the basis from which structured table is then created.

Additionally, techniques for providing assisted previews may help facilitate validation of converted entries in a table. An assisted preview, as described herein, may allow a user to compare and validate a preliminarily converted structured table, against the original image of the unstructured table, and make any edits if necessary.

In these assisted previews, additional mapping and detection of low confidence content in cells or tables may be provided. Cell mapping and detection/highlighting of low confidence results may be provided for ease of comparison and validation. For example, this may include detecting cells that might have some potential errors in them (e.g., misrecognized characters, etc.), which may have been identified during table border identification and table restructuring. Identifying such cells and providing a confidence score based on mathematical calculations may make it possible to notify a user of potentially misrecognized table cells, so that they may spend their time reviewing and validating only a subset of cells, rather than the entire table for conversion accuracy.

Moreover, once a structured table is created from an image, exporting the converted structured table to various enabled applications may be provided. Therefore, a host of enhanced techniques to convert or help facilitate conversion of an unstructured table to a structured table with high efficiency and accuracy may be provided in more detail herein.

FIG. 1 illustrates a conceptual diagram of a system 100 for converting an image into a structured table, according to an example. As shown, system 100 may include a user device 110, a network 120, and a server 130.

The user device 110 may include any computing device, such as a laptop, tablet, smart phone, appliance, home automation apparatus, or other mobile device. The user device 110 may include network capabilities in order to interface with other network elements and to transmit/receive data. The user device 110 may also be or include one or more sensors or cameras. These and other components may allow the user device 110 to obtain or receive, among other things, information associated with a table, as well as a host of other data or information.

For example, the user device 110 may be able to transmit, receive, or store data including files, emails, faxes, scans, or other documents for enterprise or personal use. The user device 110 may also access one or more web feeds. Data received via web feeds may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing. Such data may include unstructured tables or other similar content for conversion into structured tables or other structured content.

The user device 110 may also be a source or target of machine and sensor data. In an enterprise network, for example, there may be physical mobile devices, vehicles, appliances, and other enterprise systems that are equipped with electronics, software, and sensors, where most, if not all, of these items are within a network and share some measure of connectivity which enable these and other pieces of equipment to connect, communicate, and exchange data with the user device 110. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data may provide significant amounts of information and data that can be collected for use by the user device 110 or the server 130. Together with other technologies and systems described herein, the machine and sensor data may acquire and/or process various information at the user device 110 or the server 130.

The user device 110 may also include geolocation data, which may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in or associated with the user device 110 may be collected, monitored, analyzed, and/or incorporated with converting images into structured tables. More detail of the user device 110 is provided in FIG. 2.

The network 120 may be any network where transmission of data associated with converting an image into a structured table may be provided. For example, the network 120 may be a cloud-based network. The network 120 may also be a local area network (LAN), a wide area network (WAN), wireless local area network (WLAN), or other similar network.

The server 130 may include an image processing application 132 and a data store 134. The server 130 may collect, manage, process, and analyze information and data from the user device 110 or any other data source, such as an enterprise resource planning (ERP) systems and applications. An ERP system, for example, may include one or more application servers that host various ERP applications. These may include, for example, a customer relationship management (ORM) platform, system, or application. The ERP system may collect, store, manage, and interpret data associated with various enterprise functions or activities. The ERP system may provide an integrated and continuously updated view of core business processes using common databases maintained by a database management system. The ERP system may track enterprise resources (e.g., cash, raw materials, production capacity, etc.) as well as other information, such as corporate or business transactions (e.g., orders, purchase orders, payroll, ticketing, etc.). Furthermore, the applications that make up the ERP system may share data across various departments (e.g., manufacturing, purchasing, sales, accounting, etc.) that provide the data. The ERP system may facilitate information flow between many enterprise functions and may manage communications with stakeholders or other outside parties. As a result, the ERP system may contain large quantities of information and data, especially data containing unstructured or structured tables and spreadsheets.

The server 130 may be within general control of an individual, enterprise, or other organizational entity conducting operations, business, or other related activities. The server 130 may collect, manage, process, and analyze information and data from the user device 110 and/or other data sources. In order to do this, the server may include one or more data stores, one or more servers, and/or other various elements to process data for its organizational purposes. For example, the data store 134 of the server 130 may include a data management store, an operational data store, and an enterprise data store. The data management store may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an enterprise data store, which may be used for tactical and strategic decision support.

The enterprise data store may store information and data associated with reporting and data analysis, and may be instrumental to various business intelligence functions. For example, the enterprise data store may be one or more repositories of integrated data (e.g., from the operational data store) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store may be transformed and catalogued so that it may be used for data mining, analytics, and other business intelligence purposes, such as marketing, decision support, etc. Other data stores may also be provided in the server 130, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The server 130, while depicted as single server, may further include a variety of servers that facilitate, coordinate, and manage information and data. For example, the server 130, as well as others described herein, may include any number or combination of the following servers: exchange servers, content management server, application servers, database servers, directory servers, web servers, security servers, enterprise servers, and analytics servers. Other servers to provide data security and protection may also be provided.

The server 130 may also include an analytics system. The analytics system may include various layers, processors, systems or subsystems. Features and functionalities may be particularly helpful in data management, heuristics, image processing, predictive analytics, machine learning, and/or other techniques for converting an image into a structured table. Although the server 130 server is described as having an image processing application 132 and a data store 134, it should be appreciated that the user device 110 may also include an image processing application and data store as well.

There may be many examples of hardware that may be used for any of the servers, layers, subsystems, and components of system 100 described herein. For example, the server 130 may include one or more processors having an integrated circuit, and may execute software or firmware or comprise custom processing circuits, such as an application-specific integrated circuit (ASIC) or field-programmable gate array (FPGA). The server 130 may also include one or more interfaces that may be any number of hardware, network, or software interfaces that serves to facilitate communication and exchange of data between any number of or combination of equipment, protocol layers, or applications. For example, these interface(s) may each include a network interface to communicate with other servers, devices, components or network elements via the network 120 in the system 100. More detail of the user device 110 is provided in FIG. 2.

Figure 2:
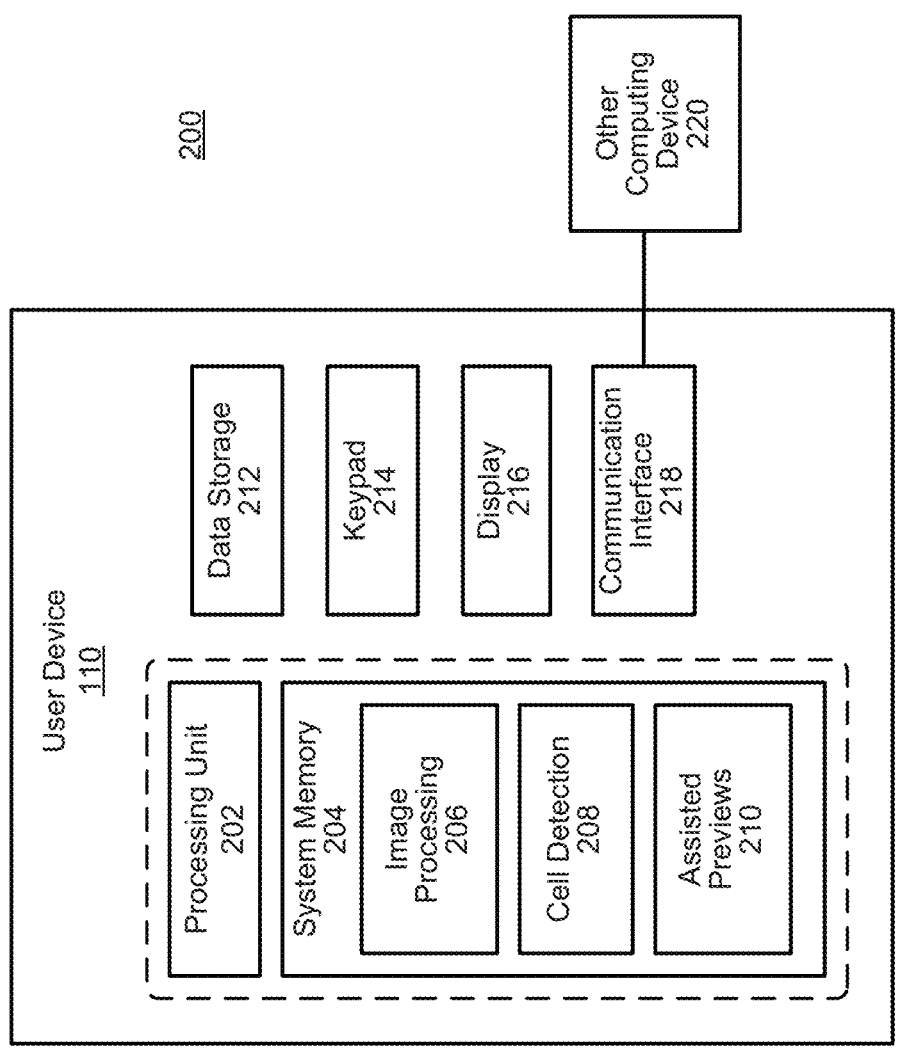
FIG. 2 illustrates a block diagram of a user device for converting an image into a structured table, according to an example.

FIG. 2 illustrates a block diagram 200 of a computing device for converting an image into a structured table, according to an example. The computing device 200 may be a user device 110, server 130, or other computing device for converting an image into a structured table. In an example, the computing device may be a user device 110 that includes a processing unit 202 and a system memory 204, which includes at least image processing 206, assisted previews 208, and cell detection 210. The user device 110 may also include data storage 212, a keypad 214, a display 216, and/or a communication interface 218 to communicate one or more additional computing devices 220. Other various components or elements may also be provided.

A processing unit 202 may include any suitable hardware to perform operations of the user device 110 described herein, including the operations described with respect to FIGS. 3-6 and techniques described herein, or otherwise. For example, the operations may include various OCR, table conversion, image processing, cell mapping and detection, assisted preview, and/or export operations. The hardware of the user device 110, including the processing unit 202, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein.

In an example, one or more of the functions and operations of the user device 110 described herein may be performed by the processing unit 202 or other hardware executing machine readable instructions stored in the system memory, which may be a non-transitory computer readable medium, comprising RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The system memory 204 may include image processing 206, assisted previews 208, cell detection 210, or other various hardware, software, or modules. Image processing 206 may be hardware or software that, when coordinated or executed by the processing unit 202, provides perspective correction for misaligned source images may be provided. For example, an image of an unstructured table may be taken at an angle or with some perspectival inaccuracy. Therefore, providing a perspective correction may be important before proceeding to convert the unstructured image to a structured table. Using various alignment and mathematical calculations, the image may be realigned to correct any perspectival irregularities. Perspective correction may provide a preprocessing step to help improve table conversion accuracy.

It should be appreciated that once these perspectival corrections are made, image processing 206 may be used to detect table borders (both visible and invisible) from the image. As described in more detail herein, identifying horizontal and vertical borders from the image and/or associated tables in the image may form the basis from which structured table is then created.

Cell detection 208 may be hardware or software that, when coordinated or executed by the processing unit 202, provides cell mapping and detection/highlighting of low confidence results may be provided for ease of comparison and validation. Cell detection 208 may be part of the process when image processing 206 is detecting visible and invisible borders to reconstruct table structure. For example, this may include detecting cells that might have some potential errors in them (e.g., misrecognized characters, etc.). Accordingly, this may allow estimation or determination of a confidence level (or score) for accuracy of reconstructed content in each cell.

Assisted previews 210 may be hardware or software that, when coordinated or executed by the processing unit 202, provides preview screen to help facilitate validation of converted entries in a table. An assisted preview, as described herein, may allow a user to compare and validate a preliminarily converted structured table, against the original image of the unstructured table, and make any edits if necessary. Together with cell mapping 208, this may also make it possible to notify a user of potentially misrecognized table cells (e.g., by visually highlight cell(s), etc.), so that the user may spend his or her time reviewing and validating only a subset of cells, rather than the entire table for conversion accuracy.

The system memory 204 and/or data storage 212 may store any information used by the user device 110 and may include memory or another type of known data storage device. It should be appreciated that the system memory 204 and/or data storage 212 described herein may include volatile and/or nonvolatile data storage that may store data and software or firmware including machine-readable instructions. The system memory 204 and/or data storage 212 may store information and data used by the user device 110, e.g., for converting an image into a structured table. The system memory 204 and/or data storage 212 may include a non-transitory computer readable medium storing machine-readable instructions executable by processing unit 202 to perform operations of the user device 110.

The user device 110 may include a user interface which may include a keypad 214 and/or a display 216. The display 216 may include a touch screen display. A user may interact with the user device 110 via the user interface to enter information, select operations, take a picture or image with an integrated or connected camera, use assisted previews to validate a structure table conversion, export data and tables, communicate with other devices, etc.

The user device 110 may include one or more communication interfaces 218. In an example, this may include one or more physical ports to connect various devices or components. In another example, the communication interface 218 may provide wired or wireless connectivity to other computing devices 220. These may include a WiFi/network interface, Bluetooth interface, cellular interface, or other network interface.

It should be appreciated that the user device 110 may include components other than what is shown. For instances, the user device may include a transmission/receiver circuit for sending/receiving data. Such circuits may further include encoders/decoders, de/modulators, and other known component for transmitting/receiving/modifying signals or data in the network, for optimizing or cleaning data that is transmitted/received by the user device 110.

Figure 3:
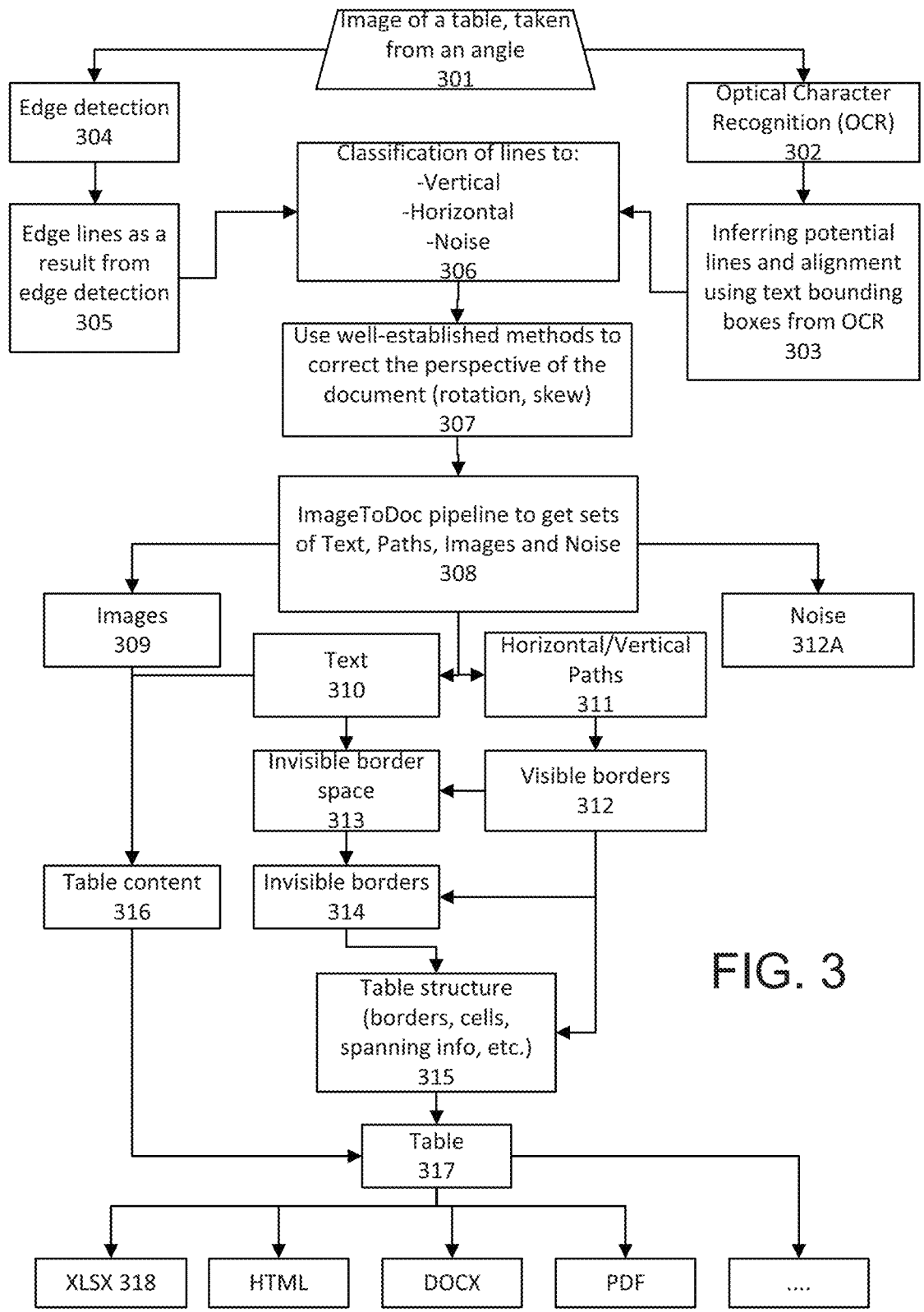
FIG. 3 illustrates a flow diagram for converting images into structured tables, according to an example.
Figure 4B:
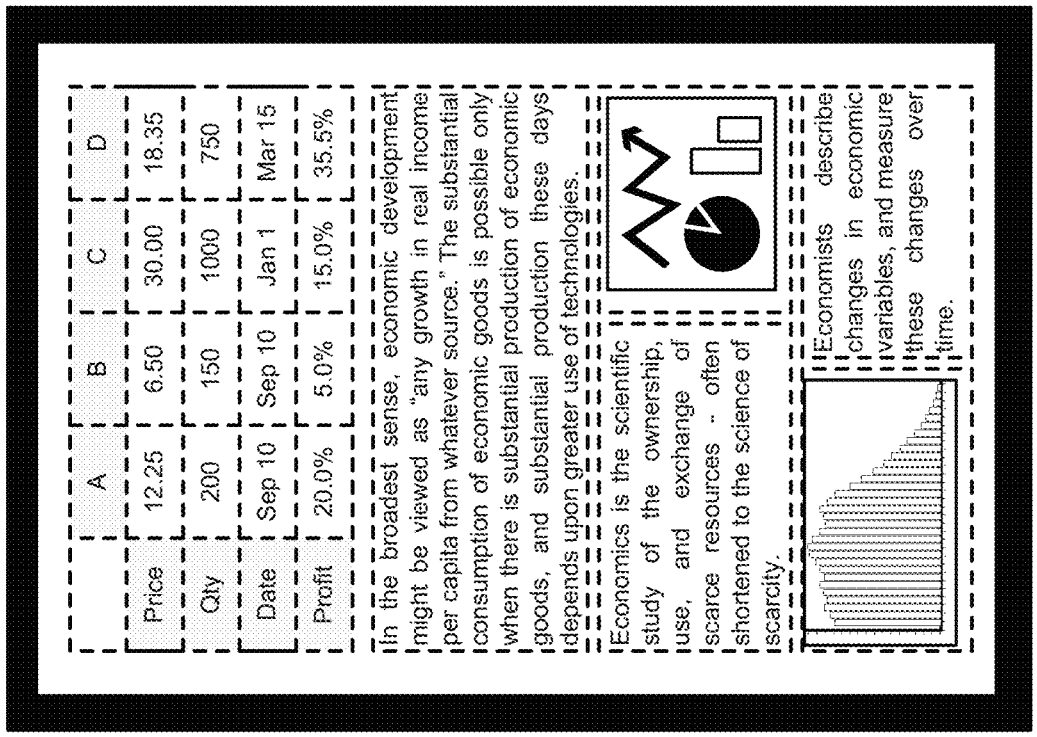
Figure 4A:
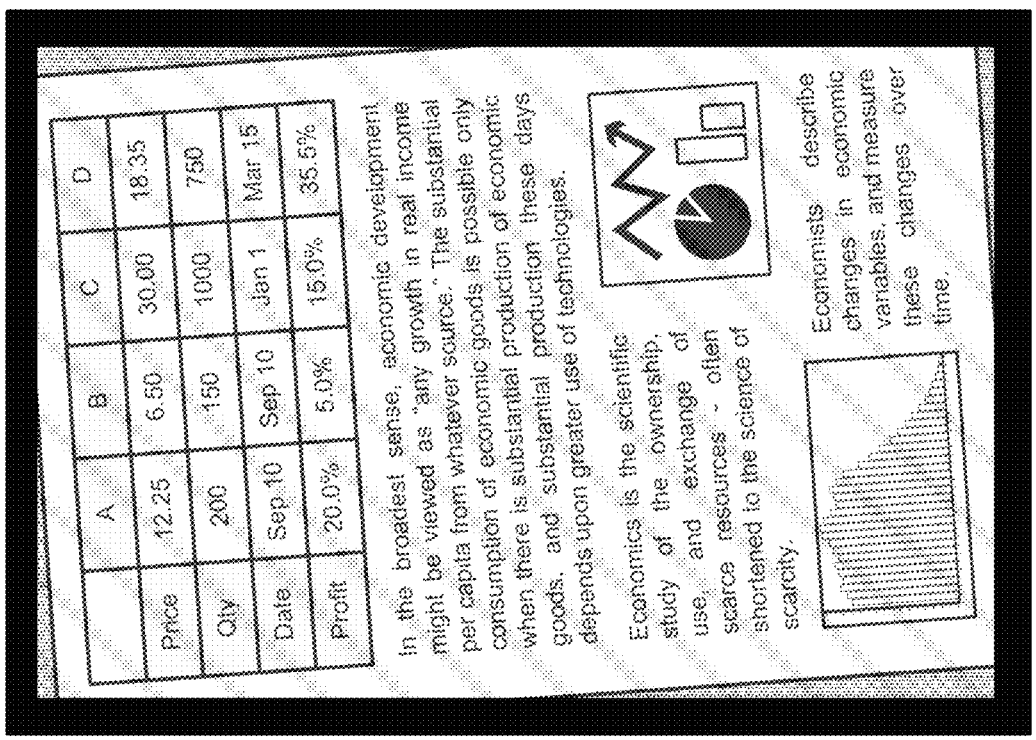

FIG. 3 illustrates a flow diagram 300 for converting images into structured tables, according to an example. As shown in flow diagram 300, an image of a table may be acquired (e.g. captured from a physical sheet of paper) 301. Since this image may be captured by a user device 110 or other image capture device, the image may be taken at an angle or have other associated human or perspectival errors. FIG. 4A illustrates a screen an image having text and a table, according to an example. As shown, the image may have been taken at an angle or with some perspectival inaccuracy. Therefore, providing a perspective correction may be important before proceeding to convert the unstructured image to a structured table.

Referring back to FIG. 3, a perspective correction of the image may begin by running an OCR engine 302, and taking the OCR output of the OCR engine, which is a set of bounding boxes of text defined by their position. Given bounding boxes of text, lines may then be inserted and fit so that they go roughly through centers of said bounding boxes. This may be provided to as many of the boxes as possible in order to discern relative alignment 303. In other words, these fitted lines may potentially be considered as parallel to table borders. This technique may also help detect edges of a potential table from the image or photo 304, and then add those lines 305 (e.g., 2 vertical, and 2 horizontal edges) to the set of potential lines from the center lines from 303. It should be appreciated that lines inserted from 304 and 305 are exemplary and various other solutions may also be provided or contemplated. Lines inserted for perspective correction may then be set and/or classified into at least three categories: horizontal, vertical, and noise (false-positive lines) 306. Once these lines are inserted and categorized, perspective correction using mathematical calculations may be used to realign and correct the perspective of the image or photo 307. More details regarding perspective correction and alignment will be provided below.

It should be appreciated that perspective correction is not as simple as rotating an image. To properly correct perspective of an image, at least four points in an uncorrected image may need to be initially identified. These four points may be points whose destination location(s) in the final perspective-corrected image should be known. Once these points and their respective destinations in perspective-corrected image are identified, perspective calculations may be applied to determine any relevant perspective transformation that needs to take place.

In order to find these initial four points, it may be helpful to begin with identifying intersection points. For instance, horizontal and vertical lines in the perspective-corrected image will have intersection points. To figure out these horizontal and vertical lines, basic properties of perspective may be relied upon. For example, no matter which angle one takes an image of, say, a paper document, the image will be that of skewed paper document. That image, however, will generally not curve the representation of that paper document. In other words, whatever is a straight line on or in the paper will be a straight line in the perspective-corrected image. Thus, we may use this information as a guide to help understand what a perspective-corrected line in the final (corrected) image would look like. The only unknown then may be the tilt or "skew" angle of that line.

Also, if the document includes a table, an assumption may be made that visible or invisible lines that form the table may be horizontal and vertical lines in the final perspective-corrected image. Because tables may have visible or invisible lines, it may be helpful to provide a general solution for both. Therefore, as described herein, text may be relied upon to infer where lines of a table may exist if an image includes a table without visible lines.

In other words, identifying aligned text may aid in identification of horizontal and vertical lines. When this occurs, it may then be important to specify which lines are vertical and which ones are horizontal. To do this, the OCR engine may be used to detect words. For each word, information may be discovered about its content (e.g., alphanumeric characters) as well as its position in the image. This information may help determine a "word center." It should be appreciated that, as used herein, "word center" may refer to more than just position relative to a word or group of letters (e.g., "Price"), but may include position relative any alphanumeric sequence (e.g., "$150.00/unit") that may be found in a table or detected by an OCR engine.

Straight lines may be identified by when they pass through as many word centers as possible. It should be appreciated that this "line passing through a point (e.g., word center)" may be subject to some error tolerance as various calculation imperfections in OCR and otherwise can occur. That said, introduction of tolerance may be not be uncommon, but what should be appreciated is identification of these straight lines as closely and as accurately as possible, passing through as many word centers along any given "line."

Since examining each possible straight line would require tremendous amount of computing resources, heuristic-based technique may be applied to help identify which of these lines are most relevant and pertinent for further use and examination. In some examples, these heuristics may rely on word features, such as size, positions, content, etc. Other various heuristics may also be used.

Once these straight lines are detected or isolated, they may then be classified as either horizontal lines or vertical lines in the perspective-corrected image. It should be appreciated that in this process, lines that do not fit into either of these categories may also be classified (e.g., tiled or angled lines).

To aid in such classification, additional perspectival properties may be used. For instance, it may be understood that a set of parallel lines in perspective-corrected image may form a fan-like pattern in perspective-skewed, uncorrected image. Taking this fan-like image, two clusters may be formed—one which contains lines tilted at steeper angles may hold as vertical lines (in perspective-corrected image) and one which contains lines titled under not-so-steep angles may hold horizontal lines (in perspective-corrected image). Lines not belonging to either of these two clusters may be classified as tilted or angled (neither horizontal nor vertical) and may not be used for further examination.

Examining of tilt angles may help find these fan-pattern-forming line clusters. For instance, taking a set of lines and going from the topmost to the bottom-most may help identify that these angles would change gradually if they form a fan-like pattern. If, on the other hand, they do not form such pattern, these angles would change erratically as we move from the top-most to the bottom-most. The examples described herein may apply this technique on all lines in order to detect a pattern of gradually changing angle pattern with other lines being significant outliers compared to the pattern. Outlier lines may then be removed bit-by-bit and such actions may be repeated until only with lines which form fan-like pattern are remaining. It should be appreciated that a similar technique may be applied to lines having steeper angles, only then they would be examined from leftmost to the rightmost and we would end up with fan-pattern-forming line cluster which has vertical lines.

In some examples, a heuristics-based technique may also be applied to help identify lines. First, it should be appreciated that out of all lines, vertical ones may be most easily recognizable because vertical lines connect words with large spacing between themselves and words to the left or right. This is because in most tables, spacing between columns of text is generally much larger than spacing between rows. So, if a table has left aligned cell content and words having large spacing to the left of them are first words in their respective cells, then a straight line passing through all such words in a table column may be very likely vertical. This classification may be modified to support right or center aligned tables. In addition, an examination of edges of words and how they are aligned (to the left, right) relative to these large spacing between table columns, it may not be too challenging to determine whether the table is left, right, or center aligned, thus making a heuristic system which on its own chooses whether to use classifier optimized for left, right or center aligned tables.

Once a set of horizontal and vertical lines are identified, four key points may be needed for perspective correction. These may be determined and calculated as intersection points of the identified horizontal and vertical lines. Their destinations in a perspective-corrected image may chosen as intersection points of a grid spaced apart so that a space or block of text from the original image may be accommodated therebetween.

It should be appreciated that the more key points that are identified, the greater ease (or greater accuracy) it may be to correct perspective. More key points, however, may mean more horizontal and vertical lines are needed. That said, more lines may mean more room for error which allow imperfections to creep in perspective calculation and degrade its quality. Without such super-saturation of lines, a sweat-spot may be had. For instance, it may be helpful to begin with an arbitrary number of lines desired to yield. In this case, the OCR engine and/or other components may be augmented with heuristic-based techniques to find this sweet-spot on its own and select number of horizontal and vertical lines based on this initial arbitrary number so that there is enough of them to make precise perspective calculations and yet not enough of them so that false positive horizontal or vertical lines start to creep in in the line selection and introduce errors in perspective calculation. It should be appreciated that these heuristics may be based on properties of lines being selected, as well as angles, words they connect, and/or any other character, spacing, or table features.

Once the image or photo is corrected for perspectival errors, it may then be used as an input for layout analysis 308. In an example, U.S. Patent Application No. 2015/0262007 to Sesum et al., entitled "Detecting and Extracting Image Document Components to Create Flow Document," which is incorporated by reference in its entirety, may provide one approach to layout analysis. Additionally and/or alternatively, layout analysis may provide a set of images 309, text that it recognized 310, horizontal and vertical paths 311, and/or noise 312A, where noise 312A may then be discarded.

Once layout analysis is performed, a table structure may be generated. For example, from horizontal and vertical paths 311, visible borders may be identified and provided at 312. Using text 310 and/or 312, a heuristic may be applied to infer invisible border space (e.g., rectangles in which the borders may be drawn) 313. Then, using visible borders 312 and invisible border space 313, actual invisible borders may be inferred and provided 314. To form the table structure 315, visible borders from 312 and invisible borders from 314 may be used. FIG. 4B illustrates a screen with visible and invisible borders for the eventual structured table, according to an example.

It should be appreciated that table text 310, for example, may be what is used to define table content 316. Furthermore, other content, such as images 309 may be used to help set the table structure 316 as well as content in any format that support inserting images into cells of tables. In other words, in some examples, techniques described herein may create tables from tables with or without discernable borders, as well as around text or content that are not part of any discernable table.

Once the table structure (e.g., borders, cells, spanning formation, etc.) and table content is sorted in 315 and 316, a structured table may be created 317. It should be appreciated that confidence scores may be determined during table sorting and restructuring. Additional details regarding cell mapping and confidence score estimation are provided below. It should also be appreciated that the structured table from 317 may be output into any file format that supports tables. These may include XLSX format 318, but also include others, such as HTML, DOCX, and PDF, to name a few. FIG. 4C illustrates a screen of a converted structured table of image having text and a table into a using perspective correction, according to an example.

Figure 5B:
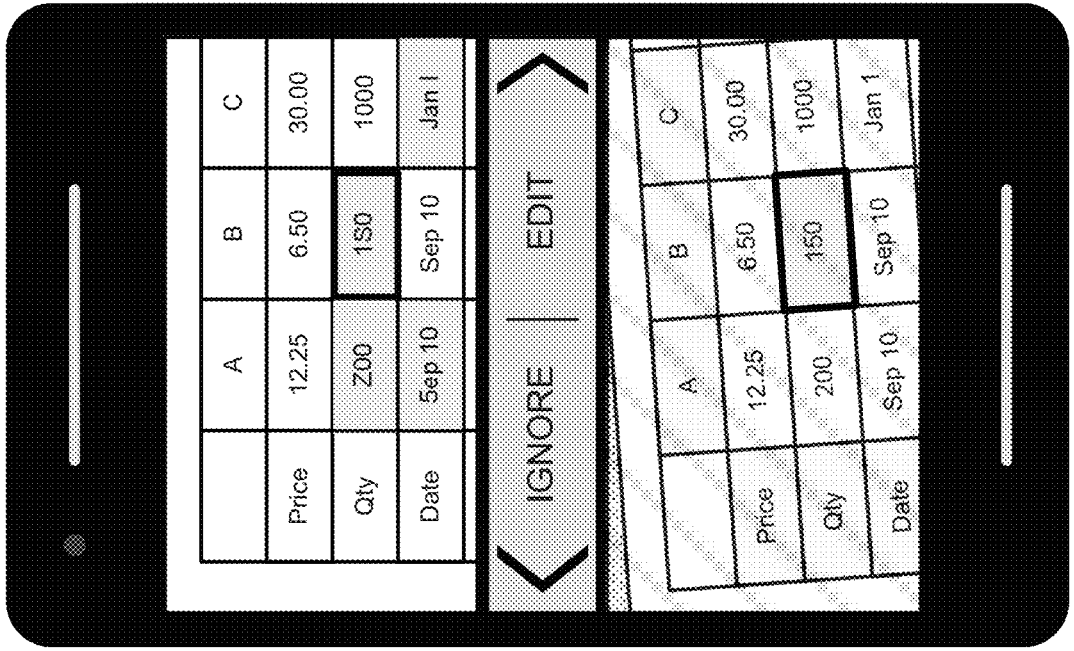
FIG. 5A-5B illustrate screens for an assisted preview using cell mapping for detecting low confidence cells to help validate conversion of an image into a structured table, according to an example.
Figure 5A:
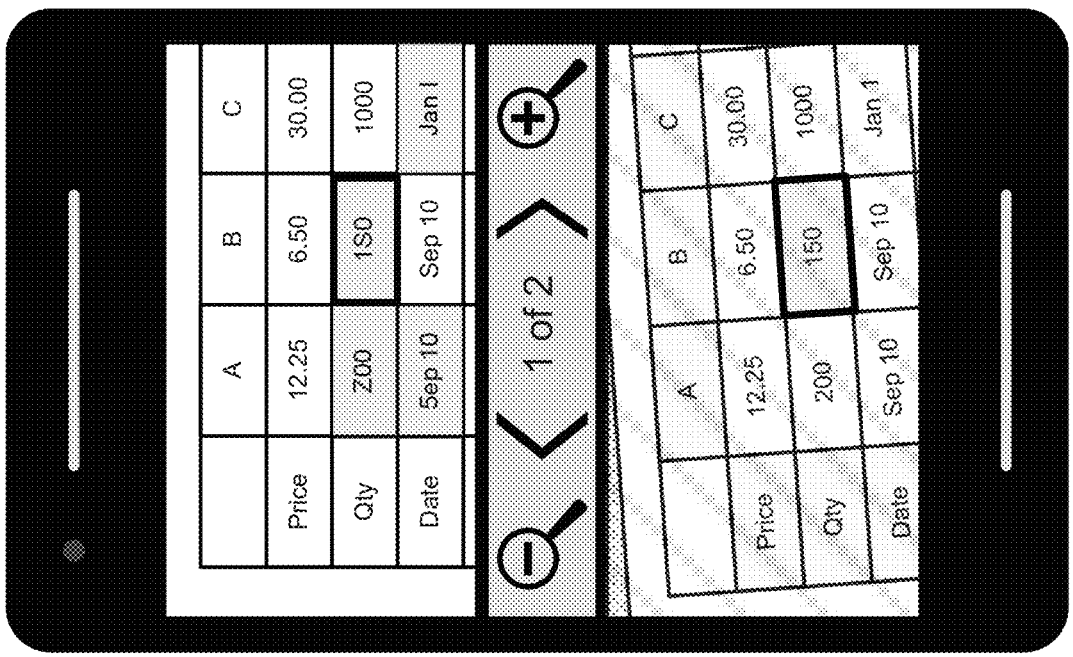

FIG. 5A-5B illustrate screens for an assisted preview using cell mapping for detecting low confidence cells to validate conversion of an image into a structured table, according to an example. It should be appreciated that the assisted preview may be provided as an intermediate step before generating a final output (e.g., exported structured table). An assisted preview, as described herein, may allow a user, at a user device 110, for example, to compare and validate the output generated from algorithm and make any edits if necessary. Examples provided herein may reflect what may be shown on a mobile device application.

Referring to FIG. 5A, the screen may depict an image or photo of the table (bottom). The screen may also depict an intermediate structured table (top) generated using OCR and various techniques described herein. In this example, the assisted preview may allow a user to preview both the preliminary structured table and the image of the physical table in one screen, which may allow ease of validation. While the structured table may be generated using heuristics, various algorithms, and OCR techniques, perfect conversion quality and replication may not be guaranteed. There may be some characters that are misrecognized, some punctuation errors, mistreated noise, etc. To mitigate this to an extent, the assisted previews allows a user to inspect the conversion before final output or export of the structured table.

As part of the assisted preview feature, cell mapping and detection/highlighting of low confidence results may be provided for ease of comparison and validation. For example, this may include detecting cells that might have some potential errors in them (e.g., misrecognized characters, etc.). This makes it possible to notify a user of potentially misrecognized table cells, so that they may spend their time reviewing and validating only a subset of cells, rather than the entire table for conversion accuracy.

In this example, the cell confidence feature may identify cells or content that have high probability of being wrong. These cells or content may be visually highlighted. As shown in FIG. 5A, a user may zoom in/out and see that one of the cells was incorrectly converted from "150" in the image to "1S0" in the preliminary structured table. As shown in FIG. 5B, the user may have the opportunity in the assisted preview screen, therefore, to "IGNORE" or "EDIT" the entry. In an example with spreadsheet applications, a basic unit on a canvas may be a cell, therefore cells which don't fall above a calibrated confidence level may be visually highlighted in red color to get attention.

It should be appreciated that more than just providing highlighting to the cell or content with relatively low confidence of accurate conversion, cell mapping may also be provided to facilitate verification and review. For example, visually highlighted result-image mapping may be provided. In this example, focus on any part of the preliminary structured table (top) will visually highlight the corresponding area on the image of the table (below), as shown in FIGS. 5A-5B. This may provide even greater ease of comparison for a user. Here, a highlighted (or bold) box may be overlayed over the area on the image corresponding to each cell selection.

Furthermore, each individual unit of output may be mapped to specific coordinates on the image. This mapping may be used to provide linked scrolling in the smart preview. For any scroll (vertical and horizontal scroll) on the results area, a corresponding scroll on the original image will automatically applied.

Identifying and marking a cell as having low confidence (e.g., probability or likelihood of a misrecognized/dropped/extra character, etc.) may involve use of two inputs. The first may be classification of connected components (CCs), that were discarded by an OCR engine, into Text or Noise (for all discarded components that belong to the cell). It should be appreciated that in an OCR engine's pipeline, the input image may be first binarized (e.g., made up of black and white pixels) and every set of connected black pixels may be referred to called a connected component.

In one example, an Optical Character Recognition (OCR) engine, used in the pipeline of converting an image of a table to a structured table, may discard some CCs that it identifies as noise. Since the OCR engine may use a set of heuristics, it may be bound to make some errors along the way. A FastTree model (or other similar model or simulation) may be used and trained, for example, to further classify these discarded CCs into either Text or Noise, to better understand if some CCs were mistakenly discarded. If a discarded CC is classified as Text, it may be a signal to mark that cell for having low detection confidence.

Figure 6B:
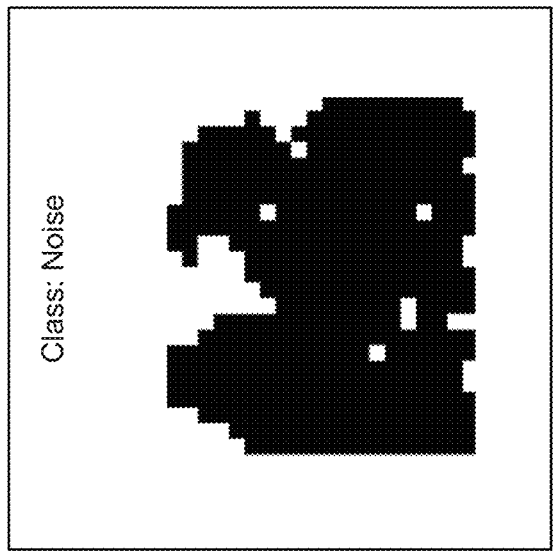
FIGS. 6A-6B illustrates classification of discarded connected components (CCs), according to an example.
Figure 6A:
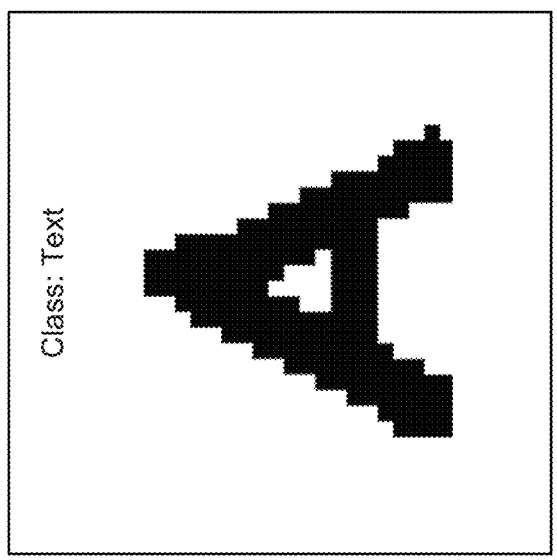

FIGS. 6A-6B illustrates examples of discarded connected components (CCs), according to an example. FIG. 6A depicts an example of a discarded CC that is classified as Text, according to an example. FIG. 6B depicts an example of a discarded CC that is classified as Noise, according to an example. The discarded CCs may be shown in black-and-white (binarized), or alternatively, in grayscale (0-255). Accordingly, any "black" identifier may refer to any non-white portion, as described herein. Referring back to FIGS. 5A-5B, to classify these discarded CCs, a FastTree model (or other similar technique) may be used. Here, the model may take the following features as inputs in determining its classification: (A) Perimeter-to-Area ratio; (B) CC's grayness distance from the document's text average grayness; (C) Height×Width of the discarded CC; (D) Number of white pixels; (E) Black-to-white pixel ratio; (F) Number of thinning operations; (G) Number of thinning operations divided by the number of non-white pixels (or black in binarized image); and (H) Number of corner pixels of the image that are white (0 to 4).

For (A) Perimeter-to-Area ratio, it should be appreciated that in some examples this may be a ratio of a number of black pixels on the edges of the CC versus a number of black pixels that make up the CC. For (B) CC's grayness distance from the document's text average grayness, it should be appreciated that in some examples, an average grayness of all text in a documents (value from 0 to 255 since it's viewed as a grayscale image) may initially needs to be determined. Then, an average grayness of the discarded CC itself may be determined. Subsequently, an absolute difference between the two may be calculated. For (F) Number of thinning operations, it should be appreciated that in some examples, a thinning operation may be defined as removal of pixels on the edges (or perimeter) of the discarded CC. A number of thinning operations, in this case, may be a number of times it may be applied in order to delete a whole character (e.g., getting full white image). It should be appreciated that using (A) and (B) as inputs may be sufficient for classification for examples as described herein, but any number of these inputs as well as other inputs not described may be used for classification of CCs.

The second input may be a probability determination that a character was properly or improperly recognized, which may be provided by an Individual Character Recognition (ICR) neural network (NN) (for all the characters that belong to the cell), or other similar analysis. In an example, after the ICR NN classifies a CC to a character, a probability determination that was output for that character (the value of the label in the outer layer of the NN) may be provided. If the probability determination is high enough, it may be inferred that the character was correctly recognized. However, if the probability is low enough, it may be determined that the ICR NN may not be reliable in this specific case. It should be appreciated that these probabilities may not be actually representative of the true correctness likelihood, so fine-tuning the ICR NN may be provided as needed.

It should be appreciated that the ICR NN may be a neural network with a single hidden layer of 256 neurons, using a hyperbolic tangent activation function (tanh), and at an output layer, a SoftMax function (which may basically scale outputs so that a sum may be 1). Accordingly, there may not be a need for any special scaling technique.

The ICR NN may use several inputs. In an example, for each image of a character, the following inputs may be used: (i) Resize it to 32×32 pixels; (ii) Overlay an 8×8 matrix; (iii) Invert the image (256−pixelValue) (e.g., as an optimization step); (iv) Apply a Gabor filter; (v) Add original image aspect ratio as the last feature (original height/width); (vi) Use the features as the input to the NN.

Figure 6C:
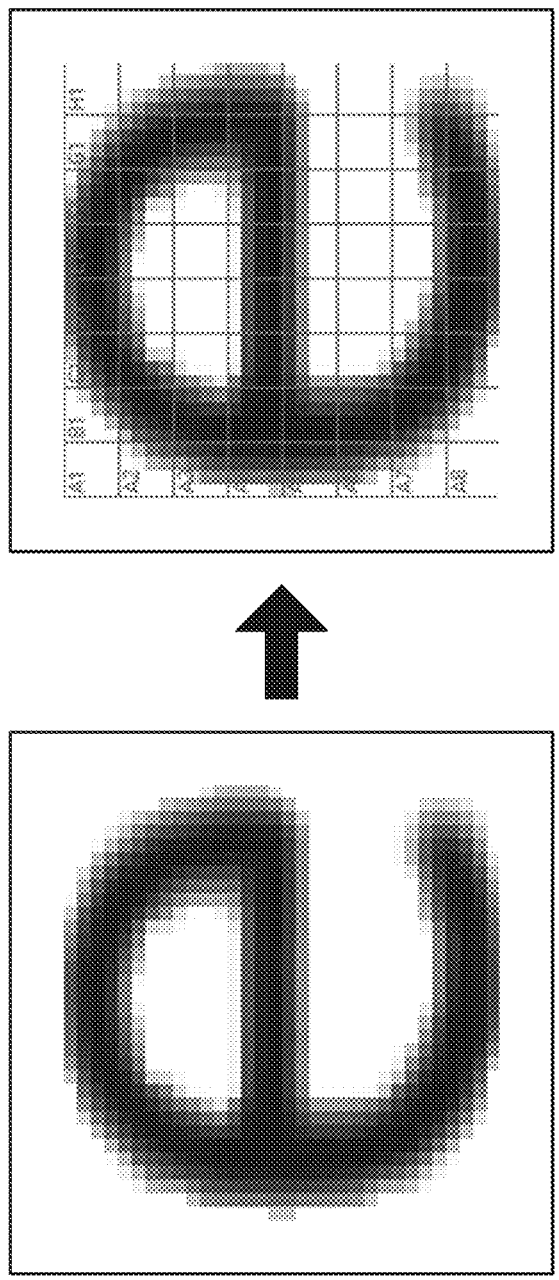
FIG. 6C illustrates a resisted character with an 8×8 overlay matrix for an Individual Character Recognition (ICR) neural network (NN), according to an example.

For (i) Resize, and (ii) Overlay, FIG. 6C illustrates examples of a resized character with an 8×8 overlay matrix for an Individual Character Recognition (ICR) neural network (NN), according to an example. For (iv) filter application, it should be appreciated that in some examples, the Gabor filter may be applied on every intersection of a grid (e.g., 7×7) on an image consisting of 4 neighboring cells. This may be done for 4 directions of the Gabor filter. The result of each (Gabor filter, direction) pair may be a single number feature that is used. A Gabor filter is a linear filter typically used for texture analysis, and more specifically to analyze whether there may be a specific frequency content n an image in specific directions in a localized region around a point or region of analysis. Although examples are directed to use a Gabor filter, which may have advantages in identifying script of a word in a multilingual document, it should be appreciated that other filters or techniques may also be applied. These may include, but not limited to, GLCM (gray0level co-occurrence matrix), local binary patterns, gray level size zone matrix, wavelet transforms, pattern spectrums, and/or other similar techniques.

To mark a recognized character as having high or low probability, a threshold per character may be set. First, a precision target that we want (e.g. 30%, meaning we want at least 30% precision [and >0% recall] when saying that a character has high probability) may be chosen. Then, for each character, their threshold may be set so that they match the chosen precision mark.

Ultimately, a cell may then be marked as having low detection confidence when at least one discarded CC has been classified as Text or when at least one character was classified with low probability. Using at least this technique in the assisted preview, may allow detection of badly recognized cells when converting an image of a table (unstructured) to a table (structured), detection of badly recognized cells when converting an image of a table to a spreadsheet document, use of multiple inputs (different pipelines) to detect badly recognized cells, detection of accidentally discarded connected components in OCR pipeline, and detection of badly recognized characters in Individual Character Recognition neural network.

Figure 5C:
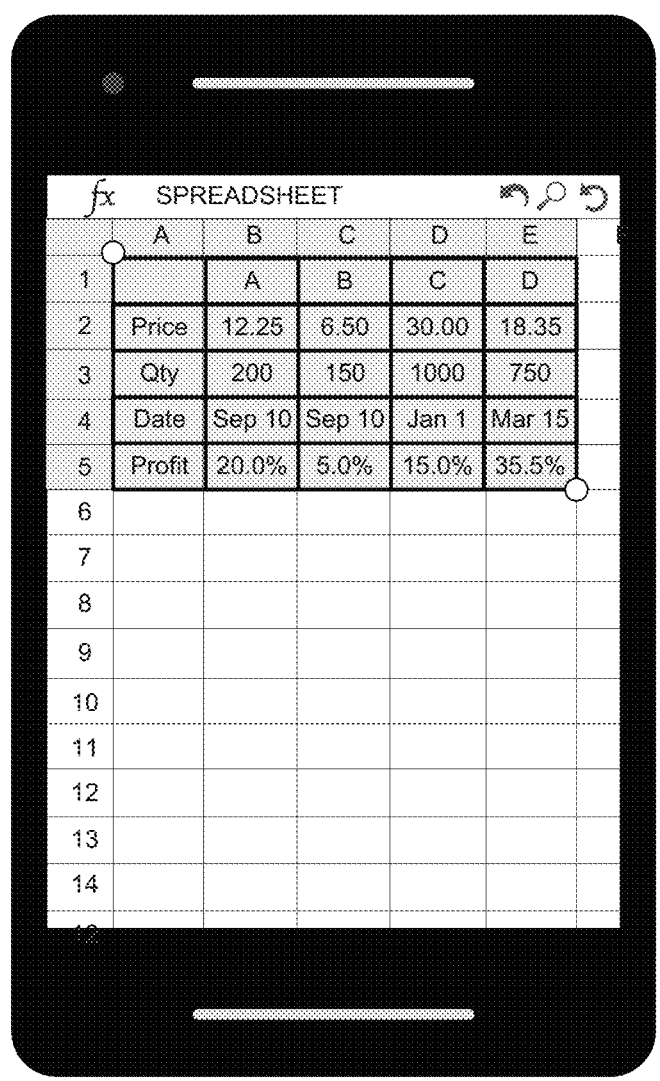
FIG. 5C illustrates a screen for a converted and validated structured table using a spreadsheet export application, according to an example.

As discussed above, once the assisted preview allows a user to make all his or her final edits or changes, the final structured table or document may then be output or exported. FIG. 5C illustrates a screen for a converted and validated structured table using a spreadsheet export application, according to an example.

Figure 7:
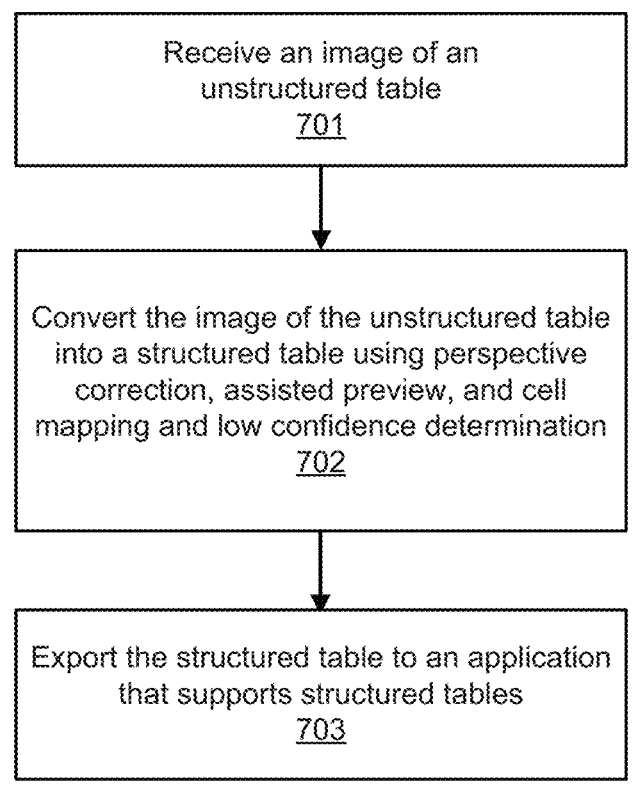
FIG. 7 illustrates a flow chart of a method for converting an image into a structured table in a network environment, according to an example.

FIG. 7 illustrates a flow chart of a method 700 for converting an image into a structured table in a network environment, according to an example. The method 700 is provided by way of example, as there may be a variety of ways to carry out the method described herein. Although the method 700 is primarily described as being performed by user device 110 (or the server 130) in at least scenarios depicted in FIGS. 1-5, the method 700 may be executed or otherwise performed by one or more processing components of the user device 110, server 130, or by another system or a combination of systems. Each block shown in FIG. 7 may further represent one or more processes, methods, or subroutines, and one or more of the blocks may include machine readable instructions stored on a non-transitory computer readable medium and executed by a processor or other type of processing circuit to perform one or more operations described herein.

At block 701, the user device 110 may receive an image of an unstructured table. This image may be taken via an imaging capture device or component of the user device 110 or may be received from another (external) source via the communication interface 218.

At block 702, the processing unit 202 of the user device 110 may convert the image of the unstructured table into a structured table. In one example, the processing unit 202, when converting the image of the unstructured table into a structured table, may include providing perspective correction for the image via system memory 204 and imagine processing 206. As discussed herein, perspective correction may be used to fix artifacts or angled images. In an example, the perspective correction for the image may be based at least in part on heuristics and identifying horizontal and vertical lines and key intersecting points made by the horizontal and vertical lines.

In some examples, the processing unit 202, when converting the image of the unstructured table into a structured table, may also include providing an assisted preview via system memory 204 and assisted previews 210. As described herein, an assisted preview may help facilitate validation of conversion of the unstructured table and the contents therein into the structured table. In an example, the assisted preview may utilize cell mapping and low confidence determination to highlight potentially misconverted content, as described above as well.

In some examples, the processing unit 202, when converting the image of the unstructured table into a structured table, may also include providing cell mapping and low confidence determination to highlight potentially misconverted content via system memory 204 and cell detection 208. In some examples, the low confidence determination may be based on a first input and a second input. The first input may include at least one connected component (CC) discarded by an optical character recognition (OCR) engine, and the second input may include a probability determination that a character was properly or improperly recognized by the OCR engine using an individual character recognition (ICR) neural network (NN).

It should be appreciated that the at least one connected component (CC) may be classified, using a simulation model, as either text or noise. In some examples, the simulation model may classify the connected component (CC) based on at least one of: (A) perimeter-to-area ratio; (B) CC's grayness distance from average grayness; (C) height×width of discarded CC; (D) a number of white pixels; (E) black-to-white pixel ratio; (F) a number of thinning operations; (G) a number of thinning operations divided by the number of non-white pixels (or black pixels in a binarized image); and (H) a number of corner pixels that are white, as described above. In the event the connected component (CC) is classified as text, the processing unit 202 via cell detection 208 may mark a cell corresponding to the text as potential misconverted content. In the event the probability determination is above a predetermined threshold, the character may also be marked as potential misconverted content.

At block 703, the processing unit 202 of the user device 110 may export the structured table to an application that supports structured tables. In an example, the communication interface 218 of the user device 110 may export the structure table to an application to another component or application of the user device 110 or to another computing device 220. In some examples, exporting the structured table to an application that supports structured tables may require validation by a user via a user device. In other examples, export of the structured table may be automatic without any user validation or input.

It should also be appreciated that the user device 110 and/or server 130 may also provide other components not shown. For example, middleware (not shown) may be included as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the user device 110, for example, may also be performed partially or in full by other various components of the overall system.

The various components, circuits, elements, and interfaces, may be any number of hardware, network, or software components, circuits, elements, and interfaces that serves to facilitate communication, exchange, and analysis data between any number of or combination of equipment, protocol layers, or applications. For example, the interfaces described herein may each include a network interface to communicate with other servers, devices, components or network elements via a network.

Although examples are directed to functions and features of the user device 110, it should be appreciated that the server 130, using the image processing application 132, for example, may perform these functions and features in a remote location to the user device 110, or a combination thereof. It should also be appreciated that other various techniques may be used or in a different combination in to provide features and functions described herein. Ultimately, the systems and methods described herein may convert or facilitate conversion of an image (of an unstructured table) into a structured table in a more efficient and less error-prone manner. Furthermore, while examples are generally directed to conversion of unstructured tables into structured tables, conversion of any unstructured data to structured data may be provided by techniques described herein, and should not be limited to table conversion.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a memory storing machine readable instructions; and
a processor to execute the machine readable instructions to:
receive an image including an unstructured table;
convert the unstructured table in the image into a structured table by identifying misconverted content using cell mapping and low confidence determination, where to perform the low confidence determination the processor is to:
identify a discarded connected component (CC) that is discarded by an optical character recognition engine as noise when performing optical character recognition on the unstructured table in the image;
classify the discarded CC as noise or text; and
determine a probability that a character in the unstructured table was properly or improperly recognized by the optical character recognition engine based on an output of an individual character recognition (ICR) neural network (NN) for that character; and
export the structured table, upon validation, to an application that supports structured tables.

2. The system of claim 1, where the discarded CC is classified using a simulation model.

3. The system of claim 2, where the simulation model classifies the discarded CC based on at least one of: (A) perimeter-to-area ratio; (B) CC's grayness distance from average grayness; (C) height×width of discarded CC; (D) a number of white pixels; (E) black-to-white pixel ratio; (F) a number of thinning operations; (G) a number of thinning operations divided by a number of non-white pixels (or black pixels in a binarized image); and (H) a number of corner pixels that are white.

4. The system of claim 3, where in the event the discarded CC is classified as text, the processor marks a cell corresponding to the text as potential misconverted content.

5. The system of claim 1, where in the event the probability is above a predetermined threshold, the character is marked as potential misconverted content.

6. The system of claim 1, where converting the image of the unstructured table into a structured table further comprises providing perspective correction for the image.

7. The system of claim 6, where the perspective correction for the image is based on heuristics and identifying horizontal and vertical lines and key intersecting points made by the horizontal and vertical lines.

8. The system of claim 1, where converting the image of the unstructured table into a structured table further comprises providing an assisted preview for facilitating and validating conversion of the unstructured table and contents therein into the structured table.

9. The system of claim 8, where the low confidence determination is used with the assisted preview.

10. A method of converting an image of an unstructured table into a structured table, comprising:
receiving, by a processor, the image including the unstructured table;
converting, by the processor, the unstructured table in the image into a structured table and identifying potential misconverted content by using cell mapping and by performing low confidence determination, where performing the low confidence determination comprises:
identifying a discarded connected component (CC) that is discarded by an optical character recognition engine as noise when performing optical character recognition on the unstructured table in the image;
classifying the discarded CC as noise or text; and
determining a probability that a character in the unstructured table was properly or improperly recognized by the optical character recognition engine based on an output of an individual character recognition (ICR) neural network (NN); and
exporting, by the processor, the structured table, upon validation, to an application that supports structured tables.

11. The method of claim 10, where the discarded CC is classified, using a simulation model, as at least one of text or noise.

12. The method of claim 11, where the simulation model classifies the discarded CC based on at least one of: (A) perimeter-to-area ratio; (B) CC's grayness distance from average grayness; (C) height×width of discarded CC; (D) a number of white pixels; (E) black-to-white pixel ratio; (F) a number of thinning operations; (G) a number of thinning operations divided by a number of non-white pixels (or black pixels in a binarized image); and (H) a number of corner pixels that are white.

13. The method of claim 12, where in the event the discarded CC is classified as text, the processor marks a cell corresponding to the text as the potential misconverted content.

14. The method of claim 10, where in the event the probability is above a predetermined threshold, the character is marked as the potential misconverted content.

15. The method of claim 10, where converting the image of the unstructured table into a structured table further comprises providing perspective correction for the image.

16. The method of claim 15, where the perspective correction for the image is based at least in part on heuristics and identifying horizontal and vertical lines and key intersecting points made by the horizontal and vertical lines.

17. The method of claim 10, where converting the image of the unstructured table into a structured table further comprises providing an assisted preview for facilitating and validating conversion of the unstructured table and contents therein into the structured table.

18. The method of claim 17, where the low confidence determination is used with the assisted preview.

19. A non-transitory computer-readable storage medium having executable instructions stored thereon, which when executed instruct a processor to perform the following:
receive an image including an unstructured table;
convert the unstructured table in the image into a structured table and identify potential misconverted content using cell mapping and low confidence determination, where to perform the low confidence determination the processor is to:
identify a discarded connected component (CC) that is discarded by an optical character recognition (OCR) engine as noise when performing optical character recognition on the unstructured table in the image;
classify the discarded CC as noise or text; and
determine a probability that a character in the unstructured table was properly or improperly recognized by the OCR engine based on an output of an individual character recognition (ICR) neural network (NN); and
export the structured table, upon validation, to an application that supports structured tables.

20. The non-transitory computer-readable storage medium of claim 19, where converting the unstructured table in the image into a structured table, further comprises:
   applying perspective correction for the image;
   displaying an assisted preview for facilitating and validating conversion of the unstructured table and contents therein into the structured table; and
   marking the identified potential misconverted content in the assisted preview.

* * * * *